United States Patent [19]

Azuma et al.

[11] Patent Number: 4,462,965
[45] Date of Patent: Jul. 31, 1984

[54] INTERMITTENT OZONIZING APPARATUS

[75] Inventors: Kenkoku Azuma; Isao Kajita; Akaru Usui, all of Nagoya, Japan

[73] Assignee: Mitsubishi Denki Kabushiki Kaisha, Tokyo, Japan

[21] Appl. No.: 384,644

[22] Filed: Jun. 3, 1982

[30] Foreign Application Priority Data

Jun. 5, 1981 [JP] Japan .................................. 56-86691

[51] Int. Cl.$^3$ ............................................. C01B 13/00
[52] U.S. Cl. .............................. 422/186.08; 204/176; 210/760; 422/186.11
[58] Field of Search ...................... 422/186.08, 186.09, 422/186.11

[56] References Cited

U.S. PATENT DOCUMENTS

| | | | |
|---|---|---|---|
| 2,872,397 | 2/1959 | Kiffer | 422/186.11 X |
| 3,970,567 | 7/1976 | Lowther | 422/186.08 |
| 3,973,133 | 8/1976 | Emigh et al. | 422/186.11 |
| 4,100,421 | 7/1978 | Tabata et al. | 422/186.08 |
| 4,136,027 | 1/1979 | Sakamoto et al. | 204/176 X |
| 4,167,484 | 9/1979 | Morikawa | 422/186.09 |
| 4,280,824 | 7/1981 | Lassmann et al. | 55/26 |

*Primary Examiner*—Leland A. Sebastian
*Attorney, Agent, or Firm*—Oblon, Fisher, Spivak, McClelland & Maier

[57] ABSTRACT

An intermittent ozonizing apparatus comprises an ozonizer for producing ozonized oxygen from an oxygen source, an adsorption-desorption tower which adsorbs ozone from the ozonized oxygen fed from the ozonizer to store the ozone, the ozone being desorbed by suction under a reduced pressure, a recycling passage for returning oxygen to the ozonizer after the ozone is adsorbed in the adsorption-desorption tower, and a blower connected in the recycling passage whereby oxygen gas containing ozone is recycled to the ozonizer during ozone adsorption and the ozone stored in the adsorption-desorption tower is desorbed by suction under a reduced pressure during ozone desorption to feed to an ozone outlet.

9 Claims, 6 Drawing Figures

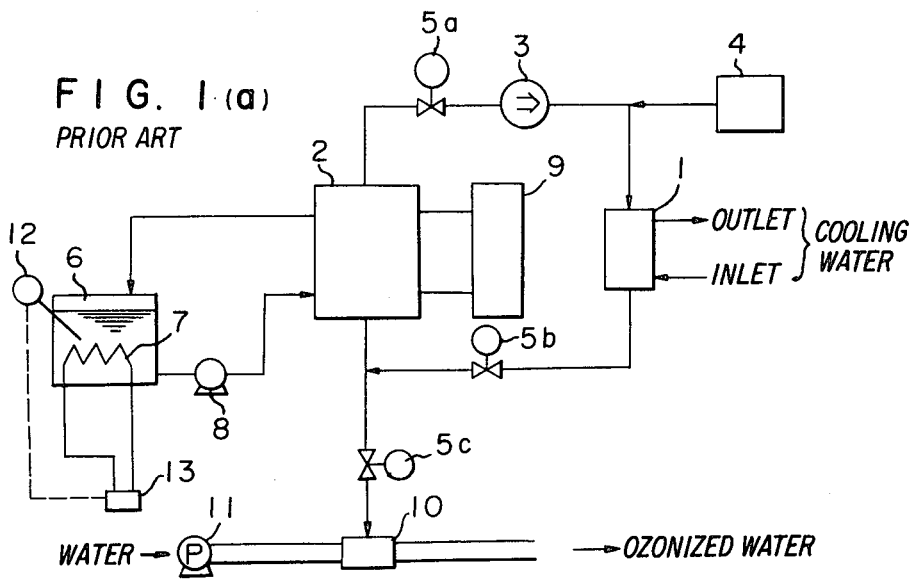
FIG. 1(a) PRIOR ART
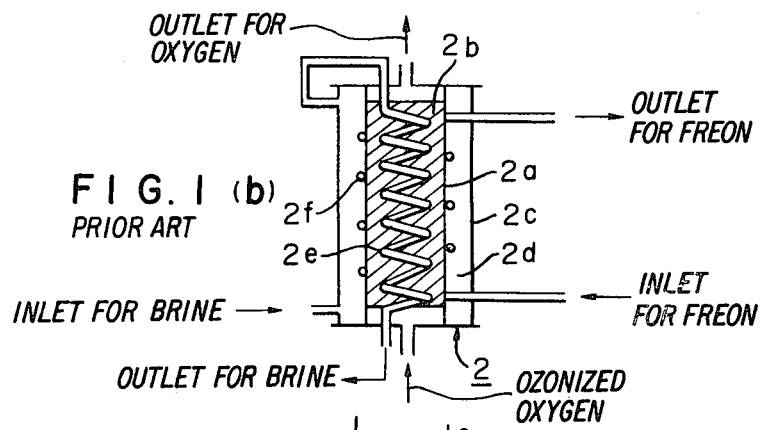
FIG. 1(b) PRIOR ART
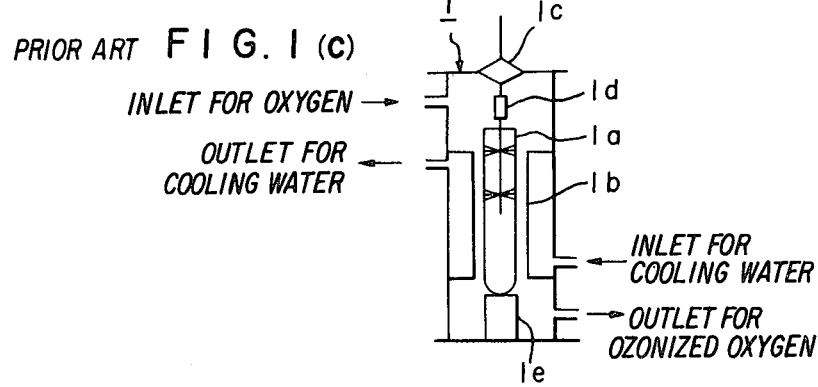
PRIOR ART FIG. 1(c)

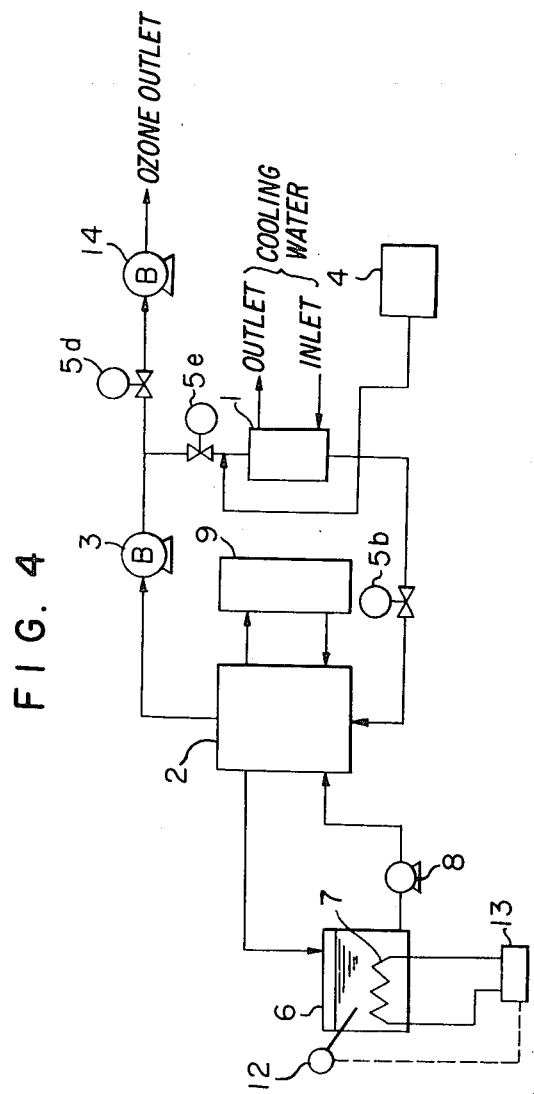
F I G. 4

INTERMITTENT OZONIZING APPARATUS

BACKGROUND OF THE INVENTION

1. Field of the Invention

The present invention relates to an intermittent ozonizing apparatus, which can supply ozone by using a simple compact blower.

2. Description of the Prior Art

A large amount of coolant water is used in power plants and chemical industries. Slime troubles have been caused by microorganisms or algae in water for supply whereby a water-way is clogged or heat-exchange efficiency is lowered.

In order to prevent such troubles, it has been considered to apply water having high ozone concentration. In order to produce the water having high ozone concentration, it is effective to use an intermittent ozonizing apparatus which produces the water having high ozone concentration by storing ozone on an absorbent during a long time by using a compact ozonizer having a small capacity and desorbing the stored ozone from the absorbent for a short time instead of the use of an ozonizer having a large capacity in view of its equipment cost and operation cost.

Referring to FIG. 1, one embodiment of the conventional typical intermittent ozonizing apparatus will be illustrated.

FIG. 1(a) is a flow diagram of the conventional intermittent ozonizing apparatus; FIG. 1(b) is a vertical sectional view of an adsorption-desorption tower; and FIG. (1c) is a vertical sectional view of an ozonizer. In FIG. 1, the reference numeral (1) designates an ozonizer; (2) designates an adsorption-desorption tower which stores ozone by absorbing the ozone generated by the ozonizer; (3) designates a recycling blower for recycling oxygen gas discharged from the absorption-desorption tower to the ozonizer (1); (4) designates an oxygen supply source which feeds oxygen to the ozonizer (1); (5a)–(5c) respectively designate valves such as electromagnetic valves; valve (5b) in a first conduit, valve (5a) is in a second conduit (6) designates a tank for a brine which heats the adsorption-desorption tower; (7) designates a heater equipped in the brine tank; (8) designates a brine pump which feeds brine from the brine tank (6) to the adsorption-desorption tower (2); (9) designates a refrigerator for coolling the adsorption-desorption tower (2); (10) designates an ejector which sucks ozone from the adsorption-desorption tower (2); (11) designates an ejector pump which feeds water into the ejector; (12) designates a temperature indication regulator which detects the temperature in the brine tank (6); and (13) designates a relay which feeds or interrupts current to the heater (7) depending upon the indication of the temperature indication regulator.

The adsorption-desorption tower (2) has a jacket structure as shown in FIG. 1(b). In the inner cylinder (2a), an ozone-adsorbent (2b) is packed and a brine jacket (2d) is formed between the inner cylinder (2a) and the outer cylinder (2c) and a brine is filled in the jacket which is connected through a brine coil (2e) to the brine tank (6) and a vapor pipe (2f) wound on the inner cylinder (2a) is connected to the refrigerator (9). As the ozone-adsorbent (2b), silica gel is usually and as a brine, ethyleneglycol or an alcohol is usually used.

The ozonizer (1) usually has a structure for silent discharge in a gap between a high voltage electrode tube (1a) and an earth electrode tube (1b) and the reference (1c) designates a high voltage bushing; (1d) designates a high voltage fuse and (1e) designates an insulating block.

One recycling system is formed by the recycling blower (3), the ozonizer (1) and the adsorption-desorption tower (2) in the order.

The operation of the apparatus will be illustrated. The operation mainly includes an ozone-adsorbing operation and an ozone-desorbing operation.

The adsorbing operation will be illustrated. Oxygen is fed from the oxygen supply source into the recycling system at a constant pressure in the normal state. The pressure is usually kept at 1.0 kg/cm$^2$ G. The electromagnetic valves (5a), (5b) are opened and the electromagnetic valve (5c) is closed. When oxygen is fed into the recycling system by the recycling blower (3), a part of oxygen is converted into ozonized oxygen by a silent discharge during passing oxygen through the discharge gap of the ozonizer (1) to produce ozonized oxygen. The ozonized oxygen is fed into the adsorption-desorption tower (2). The adsorbent in the adsorption-desorption tower (2) selectively adsorbs ozone and the residual oxygen is returned by passing through the electromagnetic valve (5a) to the ozonizer (1) by the recycling blower (3). Oxygen corresponding to the consumption of oxygen as ozone is additionally fed from the oxygen supply source (4). The ozone-adsorbent is cooled at −30° C. or lower by the refrigerator because the adsorption ratio of ozone adsorbed on the adsorbent is highly depending upon the temperature. When the temperature is lower, the adsorption ratio of ozone is higher whereas when the temperature is higher, the adsorption ratio of ozone is lower. Therefore, in the desorption of ozone, the temperature of the adsorbent is raised.

When the adsorbent in the adsorption-desorption tower (2) adsorbs ozone at substantial ozone adsorption equilibrium, the adsorbing operation is changed to the desorbing operation.

In the desorbing operation, the ozonizer (1), the recycling blower (3) and the refrigerator are stopped and the electromagnetic valve (5a), (5b) are closed and the electromagnetic valve (5c) is opened.

The brine is fed from the brine tank (6) by the brine pump (8) so as to easily desorb ozone adsorbed on the adsorbent and the temperature of the adsorbent is raised by heating. The heater (7) heats the brine to control the temperature to a constant temperature by the temperature indication regulator (12). In the state, the ejector pump (11) is actuated to suck ozone from the adsorption-desorption tower (2) by the ejector (10) and the ozone is bubbled and dissolved in water in the ejector (10) and the resulting ozonized water is fed to a part for the application.

The pressure in the adsorption-desorption tower (2) is reduced to about −70 cmHg by the suction. After the desorbing operation, it is changed to the adsorbing operation and the operation is continuously repeated.

In the intermittent ozonizing apparatus, the ejector (11) is driven only for about 5 to 10 min. per day. The availability factor is low and the pump capacity is remarkably large. Therefore, the capacity of power receiving devices must be large and the initial cost is so high as to be unfavorable. Moreover, the water flow ejector is used and accordingly, the pressure in suction is limited to about −70 cmHg because of water partial pressure.

SUMMARY OF THE INVENTION:

It is an object of the present invention to overcome the aforementioned disadvantages and to provide an intermittent ozonizing apparatus which can have simple devices having less power receiving capacity.

The foregoing and other objects of the present invention have been attained by providing an intermittent ozonizing apparatus which comprises an ozonizer for producing ozonized oxygen from an oxygen source, an adsorption-desorption tower which adsorbs ozone from the ozonized oxygen fed from the ozonizer to store the ozone, the ozone being desorbed by suction under a reduced pressure, a recycling passage for returning oxygen to the ozonizer after the ozone adsorbed in the adsorption-desorption tower, and a blower connected in the recycling passage whereby oxygen gas containing ozone is recycled to the ozonizer during ozone adsorption and the ozone stored in the adsorption-desorption tower is desorbed by suction under a reduced pressure during ozone desorption to feed to an ozone outlet.

BRIEF DESCRIPTION OF THE DRAWINGS:

FIG. 1(a) is a flow diagram of the conventional intermittent ozonizing apparatus; FIG. 1(b) is a vertical sectional view of an adsorption-desorption tower thereof; FIG. 1(c) is a vertical sectional view of an ozonizer;

FIGS. 2 and 4 are respectively flow diagrams of the other embodiments of the present invention;

DETAILED DESCRIPTION OF THE PREFERRED EMBODIMENTS:

In accordance with the present invention, a recycling blower (3) is used to desorb ozone from the adsorption-desorption tower (2) by suction instead of the ejector pump (11) and the water flow ejector (10), to provide the compact imtermittent ozonizing apparatus which can reduce the initial cost.

Figure 2:
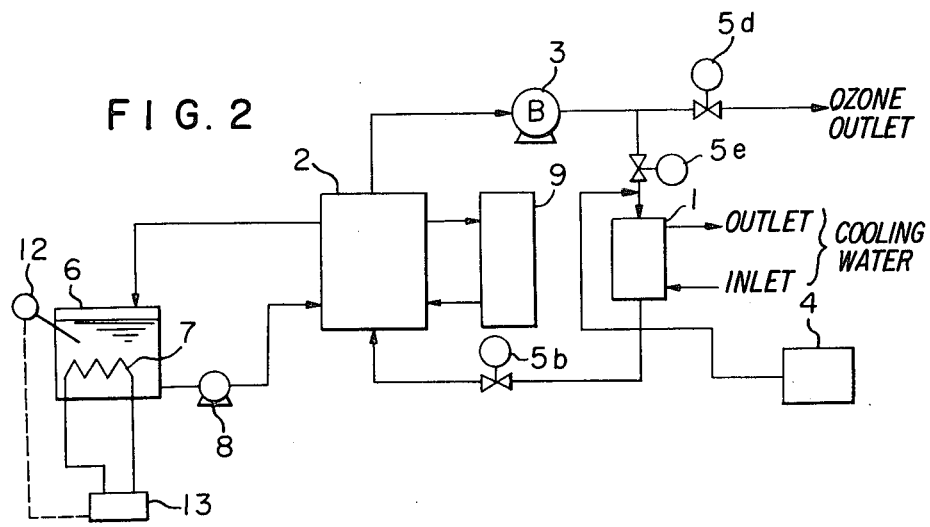

In FIG. 2, one embodiment of the present invention is illustrated. FIG. 2 is the flow diagram of this one embodiment. The same reference numbers designate identical or corresponding parts shown in FIG. 1. The description and the operation thereof are not repeated.

In the FIG. 2, the reference numeral (5e) designates a first valve connected in a second recycling passage or conduit including the recycling blower (3) and the ozonizer and (5d) designates a second valve connected in the fourth passage branched from the recycling passage to the ozone outlet. Both the valves can be electromagnetic valves. A third valve (5b), which also can be an electromagnetic valve, is connected between the ozonizer (1) and the adsorption-desorption tower (2) in the recycling passage. The first, the second and third valves are referred to as the first, the second and the third electromagnetic valves hereinbelow.

In the intermittent ozonizer having the aforementioned structure, during the ozone adsorbing operation, oxygen fed from the oxygen supply source (4) is passed through the ozonizer (1) via a third conduit to convert a part of oxygen into ozone. The first and the third electromagnetic valve (5e), (5b), are opened and the second electromagnetic valve (5d) is closed. The ozonized oxygen is fed into the adsorption-desorption tower (2) in which ozone is selectively adsorbed and the residual gas is returned to the ozonizer (1) by the recycling blower (3). The ozone-adsorbing operation is the same as that of the conventional apparatus.

In the ozone-desorbing operation, the first and the thrid electromagnetic valves (5e), (5b) are closed and the second electromagnetic valve (5d) is opened. The ozonizer (1), the refrigerator (9) are stopped and the brine pump (8) is driven and the recycling blower (3) is continuously driven. The adsorption-desorption tower (2) is heated by the brine to raise the temperature and ozone is desorbed by the suction of the recycling blower (3).

In the conventional apparatus, the suction is carried out by the ejector. In accordance with the present invention, the function for suction is provided by the recycling blower (3). The desorbed ozone is sucked by the recycling blower (3) and is passed through the second electromagnetic valve (5d) to the ozone outlet.

Figure 3:
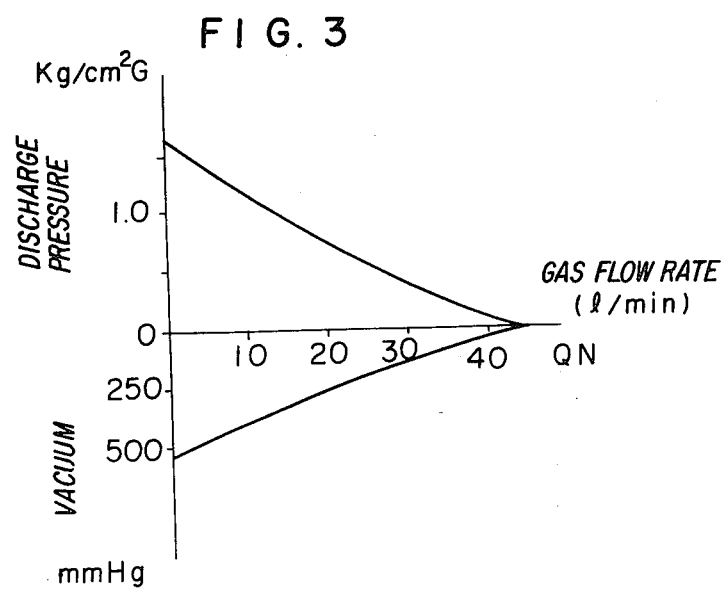
FIG. 3 shows characteristic curves of efficiency of a recycling blower.

FIG. 3 show a graph of efficiency of the diaphragm type recycling blower. During the adsorption of ozone, it operates under a discharge pressure of about 1.0 kg/cm$^2$. During the desorption of ozone, it operates in vacuum of about −50 cmHg. When it operates in vacuum of about −70 cmHg, another blower as a vacuum device is equipped at the ozone outlet to attain the desired operation.

FIG. 4 is a flow diagram of the other embodiment which operates in vacuum of about −70 cmHg in the adsorption-desorption tower (2). In FIG. 4, the reference numeral (14) designates a vacuum blower equipped at the ozone outlet. In this structure, the desorbing operation can be carried out in vacuum of about −70 cmHg.

When three or more blowers are connected in series in the operation, the suction pressure can be further reduced. The same effect of the embodiment is also attained by connecting a vacuum pump instead of the blower at the ozone outlet.

In the embodiments, the types and structures of the ozonizer (1) and the adsorption-desorption tower (2) are not critical.

As described, in accordance with the process of the present invention, the recycling blower has both functions as the recycling blower during the ozone adsorption and the vacuum blower during the ozone desorption whereby the ejector and the ejector pump can be eliminated. Therefore, the cost of the apparatus is reduced and the power receiving devices can be minimized to reduce the initial cost.

What is claimed as new and desired to be secured by Letters Patent of the United States is:

1. An intermittent ozonizing apparatus comprising:
   an adsorption-desorption tower;
   an ozonizer;
   first conduit means connecting said ozonizer to one end of said adsorption-desorption tower;
   second recycling conduit means connecting another end of said adsorption-desorption tower to said ozonizer;
   blower means in said second conduit means for blowing a gas through said second conduit means in a flow direction;
   an oxygen source;
   third conduit means connecting said oxygen source to said second conduit means at a position downstream from said blower means;
   fourth outlet conduit means connected to said second conduit means at a position between said blower means and said third conduit means; and means associated with at least one of said second and fourth conduit means for selectively discharging a gas in said second conduit means to said fourth outlet conduit means, whereby oxygen from said oxygen source is ozonated in said ozoner and said ozonizer is adsorbed at a reduced pressure in said adsorption-desorption tower, and whereby desorbed ozone from said adsorption-desorption tower can be discharged to said fourth outlet conduit means by said blower means.

2. An intermittent ozonizing apparatus according to claim 1 wherein said means for selectively discharging comprises a first valve in said second conduit means between said fourth conduit means and said ozonizer, said first valve to be opened during ozone adsoprtion and closed during ozone desorption.

3. An intermittent ozonizing apparatus according to claim 2 which comprises a second valve in said fourth discharge conduit means, said second valve being closed during ozone adsorption and opened during ozone desorption.

4. An intermittent ozonizing apparatus according to claim 3 wherein said first and second valves are electromagnetic valves.

5. An intermittent ozonizing apparatus according to claim 3 including a vacuum device in said fourth discharge conduit means, said vacuum device being actuated only during ozone desorption.

6. An intermittent ozonizing apparatus according to claim 5 wherein at least one vacuum blower is used as said vacuum device.

7. An intermittent ozonizing apparatus according to claim 5 wherein a vacuum pump is used as said vacuum device.

8. An intermittent ozonizing apparatus according to claim 1 including a refrigerator for cooling said adsorption-desorption tower in which said refrigerator is actuated during ozone adsorption to reduce a temperature of an ozone-adsorbent held in said adsorption-desorption tower.

9. An intermittent ozonizing apparatus according to claim 8 including a heater for heating said ozone-adsorbent in which said heater is actuated during ozone desorption to increase a temperature of said ozone-adsorbent held in said adsorption-desorption tower.

* * * * *